United States Patent [19]

Wells et al.

[11] 4,356,280

[45] Oct. 26, 1982

[54] ADDITIVE DISPERSIONS AND PROCESS FOR THEIR INCORPORATION WITH FIBER-FORMING POLYMERS

[75] Inventors: Rodney L. Wells, Chester; Monty L. Rowe, Midlothian, both of Va.; Samuel L. Yates, Lexington, S.C.; George R. Muller, Hopewell, Va.

[73] Assignee: Allied Corporation, Morris Township, Morris County, N.J.

[21] Appl. No.: 254,348

[22] Filed: Apr. 15, 1981

[51] Int. Cl.$^3$ .................... C08K 5/09; D06M 13/00; D06M 13/20
[52] U.S. Cl. .................... 524/148; 252/8.6; 106/300; 106/308 Q; 106/308 F; 264/205; 524/317; 524/398; 524/497; 524/601; 524/602
[58] Field of Search .................... 252/8.8, 8.6; 106/308 Q, 308 F, 300; 264/205; 260/22 A, 18 N, 37 P, 40 P; 524/148, 317, 398, 497, 601, 602

[56] References Cited

U.S. PATENT DOCUMENTS

| | | | |
|---|---|---|---|
| 2,465,319 | 3/1949 | Whinfield et al. | 528/285 |
| 2,855,156 | 10/1958 | Hochberg et al. | 241/22 |
| 3,673,147 | 6/1972 | Bor | 260/37 N |
| 3,785,973 | 1/1974 | Bernholz et al. | 252/8.8 |
| 3,833,542 | 9/1974 | Lazarus et al. | 260/45.75 C |
| 3,951,849 | 4/1976 | Vickery et al. | 106/300 |
| 3,956,008 | 5/1976 | Knepper et al. | 106/308 F |
| 4,061,708 | 12/1977 | Lazarus et al. | 264/211 |
| 4,070,342 | 1/1978 | Lazarus et al. | 260/45.75 C |
| 4,210,700 | 7/1980 | Marshall et al. | 252/8.8 |
| 4,224,080 | 9/1980 | Chambers et al. | 106/300 |

*Primary Examiner*—Ronald W. Griffin
*Attorney, Agent, or Firm*—Virginia S. Andrews

[57] ABSTRACT

A dispersion is provided for incorporation with a synthetic fiber-forming polymer. The dispersion comprises a polymer additive, such as titanium dioxide, and a glyceride which is non-resin forming when exposed to certain temperatures and pressures for specified time periods and which has an average molecular weight of between about 600 and 2400.

39 Claims, No Drawings

ADDITIVE DISPERSIONS AND PROCESS FOR THEIR INCORPORATION WITH FIBER-FORMING POLYMERS

BACKGROUND OF THE INVENTION

1. Field of the Invention

The present invention relates to a dispersion for incorporation with a synthetic fiber-forming polymer and to an improved process for melt-spinning yarn from a fiber-forming polymer. More particularly the present invention relates to dispersions of polymer additives, especially titanium dioxide particles to control fiber luster and dyes to color the yarn, and a carrier comprising a glyceride which is non-resin forming when exposed to certain temperatures and pressures for specified time periods and which has an average molecular weight of between about 600 and 2400.

2. Description of the Prior Art

In spinning highly viscous synthetic polymers such as polyamides and polyesters, it is common to incorporate additives in order to obtain required characteristics of the final polymer for specific end uses. Many such additives are known and utilized to control dyeing, static, luster, flammability, light stability, brightness, etc. A particularly preferred additive is titanium dioxide, used to decrease the luster of the resulting fiber spun from the molten polymer through conventional techniques and equipment such as a filter, spin pot, spinnerette, quench stack and take-up equipment or winder.

These additives can be incorporated in a variety of ways. In a conventional melt-spinning process starting with fiber-forming polymer chips, the additives can be added initially with the monomeric components and mixed during polymerization, or the additives can be used to coat the polymer chips which are subsequently subjected to polymerization or polycondensation. See, for example, U.S. Pat. No. 3,673,147 to Bor, hereby incorporated by reference. In both the conventional and continuous melt-spinning processes, it would be desirable to add the additives to the process stream at a point where the polymer is molten by continuously injecting a dispersion comprising the additive and a carrier into the polymer melt prior to spinning. In this manner the concentration of additive could readily be varied without a lengthy polymer transition. Further, additive agglomerates generated during polymerization would be eliminated or decreased.

Polybutene has been successfully used as a carrier for injection of organic copper stabilizers for nylon (see U.S. Pat. No. 4,061,708 to Lazarus et al., hereby incorporated by reference) and as a carrier for injection of organic copper stabilizers and titanium dioxide for polyester (see U.S. Pat. No. 4,070,342 to Lazarus et al., hereby incorporated by reference).

Unfortunately, the high temperature and pressure conditions experienced subsequent to injection cause some polybutenes to boil and vaporize; if flashed to the atmosphere, the polybutene could be condensed and collected as a contaminated oil. Also, some polybutenes separate from the pigment when exposed to high polymer melt temperatures. In order to avoid this problem, the present invention was developed.

It is believed the closest prior art in U.S. Pat. Nos. 3,833,542 to Lazarus et al.; 3,956,008 to Knepper et al.; 4,061,708 to Lazarus et al.; and 4,070,342 to Lazarus et al.

SUMMARY OF THE INVENTION

The present invention provides a dispersion for incorporation with a synthetic fiber-forming polymer and an improved process for melt-spinning yarn from a fiber-forming polymer. The preferred fiber-forming polymers are synthetic linear condensation polymers, especially polyamide and polyester fibers, prepared, for example, in accordance with U.S. Pat. Nos. 2,130,523 (polyamide) and 2,465,319 to Whinfield et al. and 2,901,466 to Kibler et al. (polyester), all of which are hereby incorporated by reference.

The dispersion for incorporation with polyamide polymer comprises: (a) 20 to 80, more preferably 30 to 50, weight percent of at least one polymer additive having an average diameter of up to 0.5 micron at spinning temperature; and (b) 20 to 80, more preferably 50 to 70, weight percent of a glyceride which is nonresin forming when exposed to temperatures of up to 280° C. and pressures of up to 4000 psig (27,600 kPa) for up to 30 seconds, and which has an average molecular weight of between about 600 and 2400. The most preferred polyamide is nylon 6.

The dispersion for incorporation with polyester polymer comprises: (a) 20 to 80, more preferably 30 to 50, weight percent of at least one polymer additive having an average diameter of up to 0.5 micron at spinning temperature; and (b) 20 to 80, more preferably 50 to 70, weight percent of a glyceride which is nonresin forming when exposed to temperatures of up to 320° C. and pressures of up to 4000 psig (27,600 kPa) for up to 60 seconds, and which has an average molecular weight of between about 600 and 2400, more preferably between 600 and 1200, and most preferably between 600 and 1000.

For polyamide polymer, the spinning temperature preferably ranges from 255° C. to 285° C., whereas for polyester polymer the spinning temperature preferably ranges from 260° C. to 320° C. In either event, the additive may either be liquid or solid at spinning temperature.

The glyceride is preferably a di- or triglyceride derived by transesterifying a glyceride, preferably a natural glyceride, with a $C_6$ to $C_{26}$, more preferably $C_6$ to $C_{22}$, most preferably $C_6$ to $C_{18}$, fatty acid ester of glycerol. Suitable natural glycerides include, for example, coconut oil, babassu oil, and palm kernel oil. See U.S. Pat. No. 3,785,973 to Bernholz et al., hereby incorporated by reference, for other examples of suitable glycerides. The most preferred glyceride is the triglyceride derived by transesterifying coconut oil (a natural triglyceride rich in $C_{12}$ lauric acid chain) with glycerol trioleate, and is rich in $C_{18}$ unsaturated oleic acid chain. The glyceride may be formed by alcoholysis, for example, using oleyl alcohol in the presence of an acid catalyst.

The Brookfield viscosity of the dispersion at 25° C., 30 rpm, #3 spindle, ranges from 500 to 8000, more preferably from 1000 to 3000, centipoises.

Pigments that can be used in the invention for coloring the fiber include those of organic nature which will either enhance or maintain the lightfastness obtained by solution dyeing skeins of the yarn. Inorganic pigments that can be used are, for example, titanium dioxide, carbon black, metal powders, iron oxide, ultramarine, lead chromate, etc. Mixtures of two or more pigments and/or additives can, of course, be used. The pigment/additive must be stable to the heat used in the spinning process. A particularly preferred additive is titanium dioxide either in rutile or anatase crystallographic form. Anatase titanium dioxide is the preferred form for delustering synthetic fibers because it is softer than rutile, thereby giving lower abrasiveness in yarn processing equipment. Commercial varieties of titanium dioxide are often surface treated with alumina or silica to improve performance. The preferred titanium dioxide additive is UNITANE 0-310 (American Cyanamid) which has specific gravity 3.8, refractive index 2.55 and approximate pH 7.3 with aluminum oxide additive. As stated previously, the additive may be either liquid or solid at spinning temperature. If solid, the longest measurable dimension of the particle is its average diameter, the preferred average diameter being 0.1 to 0.5 micron, most preferably 0.2 micron or less.

It is preferred that the dispersion further comprise about 0.25 to 2.5 percent, most preferably about 1 percent, based on the weight of the additive, of a compatible surfactant. By way of example, but not intended to be all-inclusive, are the following surfactants: some vegetable oils such as soybean oil and soya lecithin, a complex mixture of phosphatidyl choline, phosphatidyl ethanol amine and phosphoinositides; coco-methyl polyoxyethyl (15) ammonium chloride; tallow amine; polyethoxylated amines, for example, polyethoxylated (50) stearyl amine, polyethoxylated (5) tallow amine and N,N-polyoxyethyl (15) octadecyl amine; an amine-fatty acid salt such as N-tallow-1,3-diamino-propane dioleate; a polyethylene glycol ester, e.g., polyethylene glycol (5) coco fatty acid ester; ethoxylated amides, e.g., polyethoxylated (5) oleoamide, ethoxylated coconut fatty acid monoethanol amide; a fatty amide, e.g., hydrogenated tallow amide; aluminum stearate; a polyglycol such as a polyoxyethylene-polyoxypropylene condensate; salts of phosphate and sulfonate esters in aqueous or organic solvents; and modified polyester in a solvent. The surfactant functions as a slurry stabilizer. It helps in forming the dispersion by lowering the surface energy.

The dispersion may further comprise, in lieu of a surfactant preferably, an organic titanate. When used, the organic titanate preferably forms 0.01 to 5.0, more preferably 0.05 to 0.25, weight percent of the dispersion. Organic titanates are preferably added to the carrier and mixed thoroughly, followed by mixing of the additives. The organic titanates enhance the coating of the additive particles with the carrier and thus in effect reduce the dispersion viscosity for a given solids content, allowing higher additive particle concentrations without prohibitively high viscosity. The preferred organic titanate has the general structure:

$$(RO)_m-Ti-(O-X-R^2-Y)_n$$

wherein R is monoalkoxy or chelate;

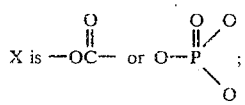

$R^2$ is dioctyl or isoheptadecyl; Y is H; m is 1; and n is 2 or 3. It is preferred that the organic titanate be selected from the group consisting of isopropyl, tri(dioctylphosphato) titanate; isopropyl, triisostearoyl titanate; and di(dioctylphosphato) ethylene titanate.

The present invention also provides improved processes for melt-spinning yarn from fiber-forming polyamide and polyester polymers. The process is comprised of adding to the specified polymer prior to spinning the dispersions as set forth previously. The dispersion may be added to the polymer when the polymer is in chip form, e.g., at the extruder throat, which is preferred, or when the polymer is molten, e.g., at the barrel (vent port) of the extruder after final polymerization or polycondensation of the polymer.

When the polymer additive is titanium dioxide, it is preferred that a sufficient amount of the dispersion be incorporated that up to 2 percent titanium dioxide on the weight of the fiber be added.

DETAILED DESCRIPTION OF THE INVENTION

The preferred dispersion of the present invention is incorporated with nylon 6 or polyethylene terephthalate and comprises 30 to 50, most preferably 37.5, weight percent titanium dioxide having an average diameter of about 0.2 micron or less at spinning temperature; 0.075 to 0.75, most preferably 0.375, weight percent soya lecithin; and 50 to 70, most preferably 62.125, weight percent coconut oil transesterified with glycerol trioleate and having an average molecular weight of about 775. An alternate but equally preferred dispersion comprises 30 to 50, most preferably 50, weight percent titanium dioxide having an average diameter of about 0.2 micron or less at spinning temperature; 0.05 to 0.25, most preferably 0.25, weight percent of an organic titanate selected from the group consisting of isopropyl, tri(dioctyl-phosphato)titanate, di(dioctylphosphato)ethylene titanate and isopropyl, triisostearoyl titanate; and 50 to 70, most preferably 50, weight percent coconut oil transesterified with glycerol trioleate and having an average molecular weight of about 775. The injection rate is dependent on the desired level of titanium dioxide in the final product, which may be up to 2 weight percent. Preferably, the dispersion is injected via the extruder vent port into the molten polymer stream at a velocity of not less than 0.5 ft/s (0.2 m/s) to prevent pluggage at the injection point. Static mixers are used to ensure good in-polymer dispersion and minimum titanium dioxide agglomeration. The residence time between the injection point and mixer is usually less than a minute. The chip-fed and melt-fed processes are equally preferred. In the chip-fed extrusion process the percent polymer which is molten preferably is greater than 50, most preferably greater than 65, to prevent extruder screw slippage and potential screw bridges.

Certain tests utilized in illustrating this invention are defined as follows.

DETERMINATION OF CARBOXYL END GROUPS OF NYLON

1. Weigh 2.0 g (to nearest tenth of a milligram) of undrawn, finish-free yarn into a clean, dry 125 ml Erlenmeyer flask.
2. Add 50 ml benzyl alcohol.
3. Heat on hot plate to 180° C.-190° C. until sample dissolves. Do not let the benzyl alcohol boil.
4. Remove flask from hot plate, cool to about 120° C., add 3 to 5 drops of phenolphthalein indicator, and titrate with standard N/20 potassium hydroxide in benzyl alcohol. Record volume of titrant used.
5. Calculate carboxyl end groups using:

$$C = \frac{(V_s - V_b) \times N \times 1000}{W}$$

where c = carboxyl end groups, in microequivalents/g,
$V_s$ = volume of titrant to titrate sample, in ml,
$V_b$ = volume of titrant to titrate blank, in ml,
N = normality of titrant, and
W = sample weight, in grams.
Note: Each day that end groups are analyzed, determine a blank on the benzyl alcohol. Add 3 to 5 drops of phenolphthalein solution to 50 ml of benzyl alcohol. Titrate with N/20 potassium hydroxide in benzyl alcohol to the first faint pink color which persists for 30 seconds while swirling the flask. If the blank is greater than 0.2 ml, reject the bottle of benzyl alcohol and use a fresh bottle.

DETERMINATION OF AMINE END GROUPS OF NYLON 6

1. Weigh 2.0 g (to nearest tenth of a milligram) of undrawn, finish-free yarn into a clean, dry 125 ml Erlenmeyer flask.
2. Add 50 ml phenol-methanol mixed solvent, 68 percent phenol content, using automatic pipet, and stopper the flask.
3. Using wrist-action shaker, shake sample until solution is complete, approximately 30 minutes.
4. Add four drops of mixed green indicator (0.1 weight-/volume percent methyl yellow and 0.1 weight-/volume percent methylene blue in methanol), and titrate with 0.01 N p-toluenesulfonic acid solution in methanol to change of color from green to gray.
5. Calculate amine end groups using:

$$A = \frac{V \times N \times 1000}{W}$$

where A = amine end groups in microequivalents/g,
V = volume of titrant, in ml,
N = normality of titrant, and
W = sample weight, in grams.

In order to illustrate the present invention, the following examples are given. Parts and percentages employed are by weight unless otherwise indicated.

EXAMPLE 1 (COMPARATIVE)

Nylon 6 polymer pellets having the characteristics designated in Table 1 and having a titanium dioxide level of about 0.52 percent (a 47 percent aqueous titanium dioxide prior art dispersion had been added to caprolactam with other additives and catalysts at the start of polymerization) were melted at about 260° C. to 265° C. and melt extruded under pressure of about 1000 psig (6895 kPa) through a 144-orifice (asymmetrical, Y-shaped) spinnerette at a rate of 134 pounds per hour (60.8 kg/hr) into a quench stack where the cross flow of quenching fluid was air at a temperature of about 15.6° C. and at a relative humidity of about 65 percent. The quenched filaments had a spin finish applied at 5.5 percent wet pickup and subsequently were taken up. The modification ratio was 2.4. The yarn was then drawn at a mechanical draw ratio of 3.0. The yarn of this example is considered the control for Examples 1-5. See Tables 1 through 3 for polymer properties, spinning conditions and physical yarn properties, respectively.

EXAMPLES 2 AND 3

The procedure of Example 1 was repeated in Examples 2 and 3, utilizing nylon 6 polymer pellets having the characteristics designated in Table 1 and a titanium dioxide level of about 0.13±0.02 percent. In both examples a dispersion comprising 39.3 weight percent finely divided titanium dioxide sold as UNITANE 0-310 (American Cyanamid Company, specific gravity 3.8, approximate pH 7.3 with aluminum oxide additive), 0.393 weight percent YELKIN DS (Ross & Rowe, Inc., a soybean lecithin of mixed phosphatidyl choline, phosphatidyl ethanolamine and phosphoinositides), and 60.307 weight percent CAPLUBE 8370 (Capital City Products Company, glycerine ester of $C_6$–$C_{18}$ acids having average molecular weight 775, viscosity at 25° C. (30 rpm, #2 spindle) of 48 cps, flash point of about 304° C., specific gravity at 15.6° C. of 0.905 to 0.920) was formed by adding the powdered titanium dioxide to the carrier containing lecithin over a one-half hour period with a Manton-Gaulin Varikinetic Mixer. The dispersion remained fluid throughout the addition period. The final dispersion density and Brookfield viscosity at 25° C. were, respectively, 1.3 g/cc and 1900 cps (30 rpm, #3 spindle). In Example 2, the dispersion was injected in the vent port of the extruder while in Example 3, injection was in the feed throat of the extruder. Note that at the extruder feed throat, the polymer is in chip form while at the extruder vent port the polymer is molten; therefore, when injecting at the extruder vent port, pressure must be used to inject the dispersion in order to overcome the pressure of the polymer or else the polymer will back up into the injection tube. The injection rate was adjusted to yield an undrawn yarn with nominal 0.5 percent titanium dioxide. Examination of undrawn filament length and cross section indicated titanium dioxide distribution was uniform and agglomerates were minor. No visible irregularities were seen along the length or cross-sections of filaments examined under the microscope. Yarn properties and spinning conditions are given in Tables 1-3.

EXAMPLES 4 AND 5

The procedure of Examples 2 and 3 was repeated in Examples 4 and 5, respectively, utilizing nylon 6 polymer pellets having the characteristics designated in Table 1 and a titanium dioxide level of about 0.13±0.02 percent. In Examples 4 and 5, however, the dispersion carrier at 61.822 weight percent was C.C.L. No. 6 (Proctor & Gamble Co., glycerine ester of mixed fatty acids having average molecular weight 800, viscosity at 25° C. (30 rpm, #2 spindle) of 48 cps, flash point of about 315° C., specific gravity at 15.6° C. of 0.919). The dispersion also comprised 37.8 and 0.378 weight percent of, respectively, UNITANE 0-310 and YELKIN DS. The final dispersion density and Brookfield viscosity at 25° C. were, respectively, 1.2 g/cc and 2016 cps (30 rpm, #3 spindle). In Example 4, the dispersion was injected in the vent port of the extruder while in Example 5, injection was in the feed throat. Examination of undrawn filament length and cross-section indicated titanium dioxide distribution was fairly uniform and agglomerates minor. Yarn properties and spinning conditions are presented in Tables 1-3.

EXAMPLE 6

Undrawn yarn produced according to the procedure of Example 1 was converted to a drawn, textured fiber for subsequent processing. The undrawn yarn was fed through a draw zone where it was drawn at a draw ratio of 3.0. The drawn yarn was then continuously fed to a stream jet texturizer operating with steam at a pressure of 68 psig (469 kPa) and at a temperature of 268° C., and subsequently was taken up. A skein of yarn was formed, tumbled, prebulked at 57.2° C. and autoclaved at 132.2° C. Textured yarn physicals are presented in Table 3.

Some of the yarn was taken off the package, and measured for crimp elongation before boil (percent), then boiled for thirty minutes in water, and measured again for crimp elongation after boil (percent). These values along with total shrinkage (percent) are presented in Table 4.

Some of the yarn was formed into sleeves which were acid mock-dyed and evaluated for breaking strength retention (percent) after 100 hours carbon arc exposure according to AATCC Test Method 16A-1977.

Some of the yarn was formed into a twenty-five oz/yd$^2$ (0.85 kg/m$^2$) BCF Saxony carpet having a 0.625 inch (1.59 cm) pile height. The carpet was backed with regular latex and jute and tested for FRP Flammability (ASTM E648/National Fire Protection Association No. 253/Federal Test Method Standard 372) in Typar without pad or glue-down. The carpet was rated Class B. Results are presented in Table 4.

Some of the yarn was formed into knitted sleeves which were dyed Acid Moss Green or Olive II for evaluation of ozone fading (AATCC Test Method 129-1975). Colorfastness of knitted sleeves dyed Olive II was tested by AATCC Test Method 107, Evaluation Procedure No. 1. Test results are presented in Table 4.

Some of the yarn was formed into knitted sleeves which were dyed eight different shades, including three original critical Laurel Crest shades (3919-A, 3805-A, and 3707-A). The dyed sleeves were exposed 40, 60, 80 and 100 hours to xenon, and Δ E (Hunter Lab) was determined for each exposure time. The average Δ E (Hunter Lab) for the eight shades is listed in Table 4. Xenon dye lightfastness is measured in accordance with AATCC Test Method 16E-1978 (XRF-1 for 20 AFU).

Some of the yarn was formed into knitted sleeves which were dyed competitively and comparatively with Acid Blue 92 for purposes of comparison with Example 7.

EXAMPLE 7

Undrawn yarn produced according to procedure of Example 2 was converted to a drawn, textured fiber for subsequent processing. The undrawn yarn was fed through a draw zone where it was drawn at a draw ratio of 2.8. The drawn yarn was then continuously fed to the steam jet texturizer operating with steam at a pressure of 68 psig (469 kPa) and at a temperature of 270° C. and subsequently was taken up. The yarn was tumbled, heat set and evaluated according to the procedures set forth in Example 6. Results are presented in Tables 3 and 4. There was no detectable difference with respect to dyeability of this sample and that of Example 6. This probably indicates negligible reaction of the carrier with the nylon end groups.

EXAMPLE 8

Nylon 6 polymer having the characteristics designated in Table 1 and having no titanium dioxide therein is produced in a continuous process, i.e., a process wherein subsequent to final polymerization, the molten polymer is pumped directly to spinning units by an extruder. The molten polymer, having a temperature of about 265° C. is melt-extruded under pressure of about 1000 psig (6895 kPa) through a 144-orifice spinnerette at a rate of 147.5 pounds per hour (66.9 kg/hr) into a quench stack where cross flow of quenching fluid is air at a temperature of about 15.6° C. and at a relative humidity of about 65 percent. The quenched filaments have a spin finish applied at 5.5 percent wet pickup and are deposited in a tow can. The undrawn denier per filament is nominally 44, the modification ratio is 2.4, and the percent finish on yarn is about 1.1. Yarn made in accordance generally with this procedure and from several tow cans was combined in a creel into a tow and was stretched in a normal manner at a stretch ratio of 2.6 to 3.0 in a tow stretcher. The tow was then fed through a stuffing box crimper using 15 pounds of steam (103 kPa) to produce about 11 crimps per inch (4.33 crimps/cm). Then, the tow was fed into a conventional cutter, was cut into staple yarn, had a lubricating overfinish applied (Quadralube L-100 AX, Manufacturers Chemicals Corporation, P.O. Box 197, Cleveland, Tenn. 37311), and was baled.

Yarn produced according to this example was tested according to the procedures set forth in Example 6 for chemical and physical properties, percent breaking strength retention, flammability (also includes Pill Test, Title 15, C.F.R., Department of Commerce FF1-70), ozone fading, and xenon dye lightfastness. Results are presented in Tables 1 and 3–4.

EXAMPLE 9

The procedure of Example 8 was repeated except that prior to cutting, the tow was tumbled, prebulked at 57.2° C. and autoclaved at 132.2° C. Test results are presented in Table 4.

EXAMPLE 10

The procedure of Example 8 was repeated utilizing nylon 6 polymer having the characteristics designated in Table 1. A dispersion comprising 37.4 weight percent UNITANE 0-310, 0.4 weight percent YELKIN DS, and 62.2 weight percent CAPLUBE 8370 was formed as in Examples 2 and 3. The Brookfield viscosity and specific gravity at 25° C. were, respectively, 1650 cps (60 rpm, #3 spindle) and 1.28. The dispersion was injected in the extruder feed line while the polymer was molten. The injection rate was adjusted to yield an undrawn yarn with nominal 0.5 percent titanium dioxide. Subsequent to application of the spin finish, the yarn was deposited in a tow can. The undrawn denier per filament of the yarn was about 44, the modification ratio was about 2.5, and the percent finish on yarn was about 1.1. Subsequently, yarn from several tow cans was combined in a creel into a tow and was stretched in a normal manner at a stretch ratio of 2.6 to 3.0 in a tow stretcher. The tow was then fed to a stuffing box crimper using 15 pounds of steam (103 kPa) to produce about 10.8 crimps per inch (4.25 crimps/cm). Then the tow was fed into a conventional cutter, was cut into staple yarn, had a lubricating overfinish applied, and was baled. Yarn produced according to this example was tested as set forth in Example 8. Results are set forth in Tables 1 and 3–4.

EXAMPLE 11

The procedure of Example 10 was repeated except that prior to cutting, the tow was tumbled, prebulked at

EXAMPLE 12

The procedure of Example 10 was repeated utilizing nylon 6 polymer having the characteristics designated in Table 1. The injection rate of the dispersion was adjusted to yield an undrawn yarn with nominal 0.13 percent titanium dioxide. The undrawn denier per filament was 44.3, and the modification ratio was about 2.4. Staple fiber having 11.7 crimps per inch (4.61 crimps/cm) was produced. Test results are set forth in Table 4.

EXAMPLE 13

The procedure of Example 12 was repeated except that prior to cutting, the tow was tumbled, prebulked at 57.2° C. and autoclaved at 132.2° C. Test results are set forth in Table 4.

EXAMPLE 14

The relative amounts of the dispersion's components at 25° C. are varied to determine the effect, if any, on settling rate. With reference to Table 5, it can be seen that the amount of YELKIN DS can be produced to 0.25 percent, based on the weight of the titanium dioxide (UNITANE 0-310), with no adverse effects on settling rate. Further, settling rate is lower for higher titanium dioxide concentrations (higher dispersion viscosities).

EXAMPLE 15

This example demonstrates the benefits obtained by utilizing an organic titanate in the dispersion to be injected rather than the soya lecithin surfactant. With reference to Table 6, it can be seen in sample numbers 7 and 14 that addition of 0.25 percent, based on the weight of the titanium dioxide and carrier, of isopropyl, tri(dioctylphosphato)titanate allows an increase to 50 weight percent of titanium dioxide in the total dispersion with no increase in viscosity over a 40 weight percent titanium dioxide dispersion with 0.5 percent, based on the weight of the titanium dioxide and carrier, of the soya lecithin surfactant. The dispersions were mixed with an Eppenbach Homomixer in 500-g batches of UNITANE 0-310 and CAPLUBE 8370, to which either YELKIN DS or an organic titanate were added.

Twenty grams of the dispersion of Sample Number 2 of Table 6 were tumbled in a Patterson Kelly twin-shell blender for 30 minutes at room temperature (25° C.) with 1800 g of nylon 6 polymer pellets characterized by, typically, 48 carboxyl ends, equivalents per $10^6$ grams polymer, 50 amine ends, equivalents per $10^6$ grams polymer, and 55±3 formic acid viscosity. In this manner, the dispersion was coated on the chips, and the chips had a titanium dioxide level of about 0.52 percent. The chips were melted at about 270° C. and melt extruded under pressure of about 1000 psig (6895 kPa) through a 14-orifice (asymmetrical, Y-shaped) spinnerette at a rate of about 23 g/min into a quench stack where the cross flow of quenching fluid was air at a temperature of about 15.6° C. and at a relative humidity of about 65 percent. The quenched filaments had a spin finish applied and subsequently were taken up. The modification ratio was targeted for 2.4±0.2, and the undrawn denier was 700. The yarn was then plied and simultaneously fed through a draw zone where it was drawn at a draw ratio of 3.2 to produce drawn yarn having a denier of 2250. The drawn yarn was then continuously fed to a steam jet texturizer operating with steam at a pressure of 70 psig (483 kPa) and at a temperature of 270° C. The yarn was skeined, autoclaved at 132.2° C., and formed into knitted sleeves for further testing as follows.

Some of the sleeves were acid mock-dyed and evaluated for breaking strength retention (percent) after 100 hours carbon arc exposure (AATCC Test Method 16A-1977). Some of the sleeves were dyed Acid Moss Green or Olive II for evaluation of ozone fading (AATCC Test Method 129-1975). Some of the sleeves were dyed Acid Beige #1, Acid Beige #2, or Laurel Crest 3919. The dyed sleeves were exposed 40, 60, 80 and 100 hours to xenon, and Δ E (Hunter Lab) was determined for each exposure time. Xenon dye lightfastness is measured in accordance with AATCC Test Method 16E-1978 (XRF-1 for 20 AFU). Results are presented in Table 7.

EXAMPLES 16-18

The procedure of Example 15 was repeated in Examples 16-18 with the following changes. In Example 16, the dispersion utilized was Sample Number 5 of Table 6, the undrawn denier was 698, steam pressure and temperature were 68 psig (469 kPa) and 268° C., respectively. In Example 17, the dispersion utilized was Sample Number 6 of Table 6, the undrawn denier was 695, and steam temperature was 272° C. In Example 18, 25 g of the dispersion of Example 2 was utilized, the undrawn denier was 695, and steam temperature was 268° C. All results are presented in Table 7. It can be seen that the physical properties of the yarn were not adversely affected by utilizing organic titanates as specified in lieu of the surfactant.

EXAMPLE 19

An injection dispersion suitable for producing a pigmented fiber is prepared by mixing (Eppenbach high shear mixer) together 59.6 parts CAPLUBE 8370, 0.4 part YELKIN DS, and 40 parts Meteor Tan 7729 (Harshaw Chemical Co., Cleveland, OH), a chromium, antimony titanate of specific gravity at 25° C. of 4.29 (35.8 lbm/gal or 4290 kg/$m^3$). About 0.125 to 0.5 part of the dispersion are injected per 100 parts nylon 6 according to the procedure of Example 3, but in lieu of the dispersion of that example, to produce a light brown fiber, possessing acceptable chemical and physical properties. Further, the feed polymer chip has no titanium dioxide and has the same chemical properties as that of Example 15.

EXAMPLE 20

The procedure of Example 19 is followed except that injection occurs via the extruder vent port. A light brown fiber, possessing acceptable chemical and physical properties, is produced.

EXAMPLES 21-22

An injection dispersion suitable for producing a delustered, pigmented fiber is prepared by mixing (Eppenbach high shear mixer) together 59.6 parts CAPLUBE 8370, 0.4 part YELKIN DS, 20 parts UNITANE 0-310, and 20 parts Meteor Tan 7729. The procedures of Examples 19 and 20 are followed in, respectively, Examples 21 and 22 to produce a light brown fiber possessing acceptable chemical and physical properties.

TABLE 1

POLYMER PROPERTIES

| Property | 1 | 2 | 3 | 4 | 5 | 6 | 7 | 8 | 9 | 10 | 11 | 12 | 13 |
|---|---|---|---|---|---|---|---|---|---|---|---|---|---|
| Carboxyl ends, equivalents per $10^6$ grams polymer | 52 | 53 | 53 | 51 | 52 | 52 | 53 | 22.4 | 22.4 | 24.1 | 24.1 | 23.9 | 23.9 |
| Amine ends, equivalents per $10^6$ grams polymer | 50 | 50 | 50 | 49 | 49 | 50 | 50 | 28.8 | 28.8 | 37.9 | 37.9 | 28.4 | 28.4 |
| Formic Acid Viscosity[1] | 50 | 52 | 53 | 51 | 50 | 50 | 52 | 50.6 | 50.6 | 48.2 | 48.2 | 49.2 | 49.2 |

[1] ASTM D-789-59T

TABLE 2

SPINNING CONDITIONS

| Condition | Example 1 | 2 | 3 | 4 | 5 | 6 | 7 |
|---|---|---|---|---|---|---|---|
| Extruder Temperature, °C. | 260 | 260 | 260 | 260 | 260 | 260 | 260 |
| Pressure, psig/kPa | 1000/6895 | 1000/6895 | 1000/6895 | 1000/6895 | 1000/6895 | 1000/6895 | 1000/6895 |
| Speed, RPM | 55.0 | 49.7 | 54.5 | 51.0 | 54.0 | 55.0 | 49.7 |
| Injection Pressure, psig/kPa | — | 255/1551 | 0/0 | 300/2068 | 0/0 | — | 225/1551 |
| Pump, RPM | — | 60 | 50 | 56 | 49 | — | 60 |
| Rate, g/min | — | 11.2 | 11.2 | 10.6 | 10.6 | — | 11.2 |
| Exit Polymer Temperature, °C. | 264 | 263 | 263 | 263 | 263 | 264 | 263 |
| Filter Pack Type | Screens | Screens | Screens | Screens | Screens | Screens | Screens |

TABLE 3

PHYSICAL YARN PROPERTIES

| Property | 1 | 2 | 3 | 4 | 5 | 6 | 7 | 8 | 9 | 10 | 11 | 12 | 13 |
|---|---|---|---|---|---|---|---|---|---|---|---|---|---|
| Undrawn Yarn | | | | | | | | | | | | | |
| Denier | 6341 | 6335 | 6271 | 6352 | 6268 | 6341 | 6335 | — | — | — | — | — | — |
| U.E., % | 406 | 459 | 478 | 506 | 477 | 406 | 459 | — | — | — | — | — | — |
| B.S., g | 7351 | 7658 | 7679 | 7646 | 7666 | 7351 | 7658 | — | — | — | — | — | — |
| $TiO_2$, % | 0.52 | 0.53 | 0.59 | 0.41 | 0.52 | 0.52 | 0.53 | — | — | — | — | — | — |
| Drawn Yarn | | | | | | | | | | | | | |
| Denier | 2282 | 2296 | 2229 | 2279 | 2277 | 2332 | 2363 | 3465 | 4189 | 3551 | 4103 | 3710 | 4283 |
| U.E., % | 48 | 44 | 39 | 44 | 47 | 39 | 46 | — | — | 70.4 | 70.4 | 74.0 | 74.0 |
| B.S., g | 8013 | 8623 | 9007 | 8043 | 8831 | 6940 | 7792 | — | — | — | — | — | — |
| Breaks & Wraps per pound | 0.49 | 0.30 | 0.17 | 0.53 | 1.03 | — | — | — | — | — | — | — | — |
| U.T.S., g/d | — | — | — | — | — | 3.0 | 3.3 | — | — | 4.7 | 4.7 | 4.5 | 4.5 |

TABLE 4

YARN TEST RESULTS

| Test | 6 | 7 | 8 | 9 | 10 | 11 | 12 | 13 |
|---|---|---|---|---|---|---|---|---|
| Crimp Elongation | | | | | | | | |
| Before Boiling, % | 20.2 | 21.5 | 13.9 | 26.1 | 15.1 | 26.7 | 14.7 | 25.4 |
| After Boiling, % | 32.9 | 37.1 | 22.9 | 35.1 | 23.2 | 34.6 | 23.9 | 33.7 |
| Shrinkage, % | 11.3 | 13.0 | 9.95 | 8.25 | 8.85 | 7.95 | 9.90 | 8.05 |
| Breaking Strength Retention, %* | 40.0 | 22.7 | 67.9 | 58.0 | 12.7 | 36.0 | 30.9 | 66.9 |
| Flammability | | | | | | | | |
| CRF, watts/$cm^2$** | 0.31 | 0.25 | 0.37/0.65 | — | 0.34/0.46 | — | 0.27/0.51 | — |
| pill, pass/fail | — | — | pass | pass | pass | pass | pass | pass |
| Ozone Fading | | | | | | | | |
| Acid Moss Green | | | | | | | | |
| Cycle 1 Δ L (Hunter Lab) | 1.2 | 1.3 | 0.33 | 1.32 | 0.68 | 0.92 | 0.48 | 0.59 |
| Cycle 1 Δ E (Hunter Lab) | 2.2 | 2.1 | 1.47 | 2.25 | 2.15 | 1.74 | 1.60 | 1.39 |
| Olive II | | | | | | | | |
| Cycle 1 Δ L (Hunter Lab) | 3.3 | 2.6 | 0.20 | 0.28 | 0.40 | 0.34 | 0.71 | 0.39 |
| Cycle 1 Δ E (Hunter Lab) | 4.8 | 3.8 | 0.66 | 0.82 | 0.85 | 0.83 | 0.78 | 0.82 |
| Colorfastness | 4 | 4 | 4 | 4 | 3–4 | 3–4 | 3–4 | 3–4 |
| Xenon Dye Lightfastness | | | | | | | | |
| Δ E (Hunter Lab)*** | 2.59 | 2.85 | 3.43 | 3.79 | 3.80 | 4.26 | 3.07 | 4.30 |

*Staple yarns of Examples 8–13 spun as 3.0/2, 4.7ZX4.0S. Scoured, 100 hours carbon arc exposure.
**Examples 8–13 show average CRF watts/$cm^2$ for carpet loose/glue-down.
***Examples 8–13 represent the average Δ E (Hunter Lab) for 3 shades, 100 hours.

TABLE 5

| % UNITANE 0-310 | % YELKIN DS (b) | Dispersion VISCOSITY (c) | Percent Settled After X Days (a) | | | | |
|---|---|---|---|---|---|---|---|
| | | | 2 | 4 | 7 | 14 | 33 |
| 39.70 | 0.25 | 1680 | 0 | 1.9 | 3.7 | 5.6 | 7.4 |
| 39.72 | 0.50 | 1740 | 0 | 1.8 | 2.6 | 4.4 | 7.0 |
| 39.72 | 1.0 | 1720 | 0 | 1.8 | 3.6 | 5.5 | 8.2 |
| 42.34 | 1.0 | 2180 | 0 | 0 | 0.9 | 5.6 | 8.2 |
| 44.85 | 1.0 | 2880 | 0 | 1.1 | 1.1 | 1.1 | 4.3 |
| 45.36 | 1.0 | 4360 | 0 | 0 | 1.0 | 1.0 | 2.9 |
| 46.93 | 1.0 | 4800 | 0 | 0 | 1.1 | 2.2 | 3.3 |
| 49.67 | 1.0 | 3160 | 0 | 0 | 1.2 | 2.4 | 3.5 |

(a) Calculated as: $\frac{\text{Depth of Clear Top Layer (cm)}}{\text{Total Slurry Depth (cm)}} \times 100\%$ Total slurry depth was about 9–11 cm - in a 16 oz. bottle.
(b) Based on the weight of UNITANE 0-310.
(c) Brookfield Viscosity (centipoises) at 25° C, 30 RPM No. 3 spindle (except No. 4 for 45.36 and 46.93%).

TABLE 6

| Sample | Surfactant/Organic Titanate[1] | | TiO$_2$ (wt. %) | Sp. Gr. 25° C. | Brookfield Viscosity 25° C. (cps)[2] | | |
|---|---|---|---|---|---|---|---|
| | | | | | 6 RPM | 12 RPM | 30 RPM |
| 1 | YELKIN DS | 0.5% | 49.3 | — | 22000 | 12850 | 6520 |
| 2 | KR-12 | 0.25% | 49.6 | — | 5400 | 3500 | 1880 |
| 3 | KR-12 | 0.125% | 49.5 | — | 10100 | 5700 | 2952 |
| 4 | KR-12 | 0.063% | 49.6 | — | 12320 | 7150 | 3504 |
| 5 | KR-212 | 0.25% | 49.5 | — | 4700 | 2950 | 1680 |
| 6 | KR-TTS | 0.25% | 49.5 | — | 11100 | 6180 | 2980 |
| 7 | KR-12 | 0.25% | 49.46 | 1.427 | 3800 | 2660 | 1540 |
| 8 | KR-12 | 0.25% | 59.33 | 1.644 | 16500 | 9750 | 5100 |
| 9 | KR-TTS | 0.25% | 49.34 | 1.440 | 7600 | 4250 | 2266 |
| 10 | KR-TTS | 0.25% | 59.12 | 1.638 | 44800 | 26250 | 13300 |
| 11 | YELKIN DS | 0.5% | 49.29 | 1.442 | 10000 | 6000 | 3120 |
| 12 | YELKIN DS | 0.1% | 39.70 | 1.267 | 5100 | 3150 | 1680 |
| 13 | YELKIN DS | 0.2% | 39.72 | 1.303 | 5300 | 3200 | 1740 |
| 14 | YELKIN DS | 0.4% | 39.72 | 1.268 | 5640 | 3300 | 1720 |
| 15 | YELKIN DS | 0.425% | 42.34 | 1.306 | 6700 | 4020 | 2180 |
| 16 | YELKIN DS | 0.45% | 44.85 | 1.348 | 9940 | 5700 | 2880 |
| 17 | YELKIN DS | 0.475% | 46.93 | 1.418 | 12500 | 7400 | 4800 |
| 18 | YELKIN DS | 0.455% | 45.36 | 1.361 | 9880 | 5700 | 4360 |
| 19 | YELKIN DS | 0.50% | 49.67 | 1.428 | 10800 | 6150 | 3160 |

[1]The organic titanates utilized are as follows: KR-12: isopropyl, tri(dioctylphosphato)titanate; KR-212: di(dioctylphosphato)ethylene titanate; and KR-TTS: isopropyl triisostearoyl titanate.
[2]A #3 spindle was used for all samples except 1 and 10, which used a #4 spindle.

TABLE 7

| PROPERTY | EXAMPLE | | | |
|---|---|---|---|---|
| | 15 | 16 | 17 | 18 |
| Denier | 2272 | 2273 | 2279 | 2246 |
| B.S., g | 7395 | 7607 | 7377 | 7492 |
| U.E., Percent | 60.6 | 64.6 | 60.5 | 63.4 |
| U.T.S., g/d Breaking Strength | 3.3 | 3.3 | 3.3 | 3.3 |
| Retention, Percent* | 9.49 | 15.94 | 13.53 | 18.57 |
| Ozone Fading Acid Moss Green | | | | |
| Cycle 1 Δ L (Hunter Lab) | 5.5 | 5.6 | 5.5 | 5.9 |
| Cycle 1 Δ E (Hunter Lab) | 7.3 | 7.4 | 7.2 | 7.7 |
| Olive II | | | | |
| Cycle 1 Δ L (Hunter Lab) | 1.3 | 1.4 | 1.5 | 1.6 |
| Cycle 1 Δ E (Hunter Lab) | 1.8 | 1.8 | 2.1 | 2.1 |
| Xenon Dye Lightfastness** | | | | |
| Acid Beige #1 | | | | |
| Δ E (Hunter Lab) | 2.3 | 2.1 | 2.4 | 2.4 |
| Acid Beige #2 | | | | |
| Δ E (Hunter Lab) | 2.8 | 3.0 | 2.9 | 2.9 |
| Laurel Crest Shade 3919 | | | | |
| Δ E (Hunter Lab) | 3.4 | 4.0 | 3.8 | 3.8 |

*100 Hours carbon arc exposure
**80 Hours

What is claimed is:

1. A dispersion for incorporation with polyamide polymer, said dispersion comprising:

(a) 20 to 80 weight percent of at least one polymer additive having an average diameter of up to 0.5 micron at spinning temperature; and
   (b) 20 to 80 weight percent of a glyceride which is non-resin forming when exposed to temperatures of up to 280° C. and pressures of up to 4000 psig (27,600 kPa) for up to 30 seconds, and which has an average molecular weight of between about 600 and 2400.

2. The dispersion of claim 1 wherein the additive forms 30 to 50 weight percent of the dispersion, and the glyceride forms 50 to 70 weight percent of the dispersion.

3. The dispersion of claim 1 wherein the average molecular weight of the glyceride is between about 600 and 1200.

4. The dispersion of claim 1 wherein at least one additive is titanium dioxide.

5. The dispersion of claim 1 wherein the glyceride is formed by transesterification of another glyceride with a $C_6$ to $C_{26}$ fatty acid ester of glycerol.

6. The dispersion of claim 5 wherein the fatty acid ester of glycerol is a $C_6$ to $C_{18}$ fatty acid ester of glycerol.

7. The dispersion of claim 5 wherein coconut oil is transesterified with glycerol trioleate.

8. The dispersion of claim 1 wherein the dispersion further comprises about 0.25 to 2.5 percent, based on the weight of the additive, of a compatible surfactant.

9. The dispersion of claim 1 wherein the additive is liquid at spinning temperature.

10. The dispersion of claim 1 wherein the spinning temperature ranges from 255° C. to 285° C.

11. The dispersion of claim 1 wherein the Brookfield viscosity of the dispersion at 25° C. ranges from 500 to 8000 centipoises.

12. The dispersion of claim 1 wherein the dispersion further comprises about 0.01 to 5.0 percent, based on the weight of the dispersion, of an organic titanate having the general structure $$(RO)_m-Ti+O-X-R^2-Y)_n$$

wherein R is monoalkoxy or chelate;

X is

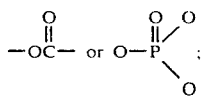

$R^2$ is dioctyl or isoheptadecyl; Y is H; m is 1; and n is 2 or 3.

13. The dispersion of claim 12 wherein the dispersion comprises about 0.05 to 0.25 percent, based on the weight of the dispersion, of the organic titanate.

14. The dispersion of claim 4 wherein (a) the titanium dioxide forms 30 to 50 weight percent of the dispersion, (b) the dispersion further comprises about 0.25 to 2.5 percent, based on the weight of the titanium dioxide, of a compatible surfactant, (c) the average molecular weight of the glyceride is between 600 and 1200, and (d) the glyceride is formed by transesterification of coconut oil with a $C_6$ to $C_{18}$ fatty acid ester of glycerol.

15. The dispersion of claim 4 wherein (a) the titanium dioxide forms 30 to 50 weight percent of the dispersion, (b) the dispersion further comprises about 0.01 to 5.0 percent, based on the weight of the dispersion, of an organic titanate having the general structure $(RO)_m$—Ti—$(O-X-R^2-Y)_n$ wherein R is monoakoxy or chelate;

X is

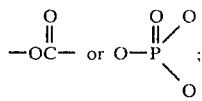

$R^2$ is dioctyl or isoheptadecyl; Y is H; m is 1; and n is 2 or 3, (c) the average molecular weight of the glyceride is between 600 and 1200, and (d) the glyceride is formed by the transesterification of coconut oil with a $C_6$ to $C_{18}$ fatty acid ester of glycerol.

16. A dispersion for incorporation with polyester polymer, said dispersion comprising:
(a) 20 to 80 weight percent of at least one polymer additive having an average diameter of up to 0.5 micron at spinning temperature; and
(b) 20 to 80 weight percent of a glyceride which is nonresin forming when exposed to temperatures of up to 320° C. and pressures of up to 4000 psig (27,600 kPa) for up to 60 seconds, and which has an average molecular weight of between about 600 and 2400.

17. The dispersion of claim 16 wherein the additive forms 30 to 50 weight percent of the dispersion, and the glyceride comprises 50 to 70 weight percent of the dispersion.

18. The dispersion of claim 16 wherein the average molecular weight of the glyceride is between 600 and 1200.

19. The dispersion of claim 16 wherein the glyceride is formed by transesterification of another glyceride with a $C_6$ to $C_{26}$ fatty acid ester of glycerol.

20. The dispersion of claim 19 wherein the fatty acid ester of glycerol is a $C_6$ to $C_{18}$ fatty acid ester of glycerol.

21. The dispersion of claim 16 wherein the dispersion further comprises about 0.25 to 2.5 percent, based on the weight of the additive, of a compatible surfactant.

22. The dispersion of claim 16 wherein the additive is liquid at spinning temperature.

23. The dispersion of claim 16 wherein the spinning temperature ranges from 260° C. to 320° C.

24. The dispersion of claim 16 wherein the viscosity of the dispersion at 25° C. ranges from 500 to 8000 centipoises.

25. The dispersion of claim 16 wherein at least one additive is titanium dioxide.

26. The dispersion of claim 16 wherein the dispersion further comprises about 0.01 to 5.0 percent, based on the weight of the dispersion, of an organic titanate having the general structure

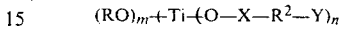

wherein R is monoalkoxy or chelate; S is

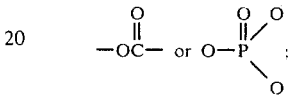

$R^2$ is dioctyl or isoheptadecyl; Y is H; m is 1; and n is 2 or 3.

27. The dispersion of claim 26 wherein the dispersion comprises about 0.05 to 0.25 percent, based on the weight of the dispersion, of the organic titanate.

28. The dispersion of claim 25 wherein (a) the titanium dioxide forms 30 to 50 weight percent of the dispersion, (b) the dispersion further comprises about 0.25 to 2.5 percent, based on the weight of the titanium dioxide, of a compatible surfactant, (c) the average molecular weight of the glyceride is between 600 and 1200, and (d) the glyceride is formed by the transesterification of coconut oil with a $C_6$ to $C_{18}$ fatty acid ester of glycerol.

29. The dispersion of claim 25 wherein (a) the titanium dioxide forms 30 to 50 weight percent of the dispersion, (b) the dispersion further comprises about 0.01 to 5.0 percent, based on the weight of the dispersion, of an organic titanate having the general structure $(RO)_m$—Ti—$(O-X-R^2-Y)_n$ wherein R is monoalkoxy or chelate;

X is

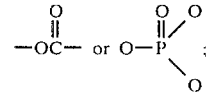

$R^2$ is dioctyl or isoheptadecyl; Y is H; m is 1; and n is 2 or 3, (c) the average molecular weight of the glyceride is between 600 and 1200, and (d) the glyceride is formed by the transesterification of coconut oil with a $C_6$ to $C_{18}$ fatty acid ester of glycerol.

30. In a process for melt-spinning yarn from fiber-forming polyamide polymer the improvement comprising:
adding to the polymer prior to spinning a dispersion comprising;
20 to 80 weight percent of at least one polymer additive having an average diameter of up to 0.5 micron at spinning temperature; and 20 to 80 weight percent of a glyceride which is non-resin forming when exposed to temperatures up to 280° C. and pressures of up to 4000 psig (27,600 kPa) for up to 30 seconds, and which has an average molecular weight of between 600 and 2400.

31. The process of claim 30 wherein the dispersion is added into the polymer when the polymer is in chip form.

32. The process of claim 31 wherein the dispersion is added into the polymer at the throat of an extruder.

33. The process of claim 30 wherein the dispersion is added into the polymer when the polymer is molten.

34. The process of claim 33 wherein the dispersion is added to the polymer at the barrel of an extruder.

35. In a process for melt-spinning yarn from a fiber-forming polyester polymer, the improvement comprising:

adding to the polymer prior to spinning a dispersion comprising:

20 to 80 weight percent of at least one polymer additive having an average diameter of up to 0.5 micron at spinning temperature; and 20 to 80 weight percent of a glyceride which is non-resin forming when exposed to temperatures of up to 320° C. and pressures of up to 4000 psig (27,600 kPa) for up to 60 seconds, and which has an average molecular weight of between about 600 and 2400.

36. The process of claim 35 wherein the dispersion is added into the polymer when the polymer is in chip form.

37. The process of claim 36 wherein the dispersion is added into the polymer at the throat of an extruder.

38. The process of claim 35 wherein the dispersion is added into the polymer when the polymer is molten.

39. The process of claim 38 wherein the dispersion is added to the polymer at the barrel of an extruder.

* * * * *